United States Patent [19]

Muehl

[11] 4,251,049
[45] Feb. 17, 1981

[54] TANK VALVE APPARATUS

[76] Inventor: Herman D. Muehl, 10851 Drury La., Lynwood, Calif. 90262

[21] Appl. No.: 5,181

[22] Filed: Jan. 22, 1979

[51] Int. Cl.³ .......................................... F16K 31/122
[52] U.S. Cl. .................................. 251/58; 74/18.2; 92/168; 60/533; 251/144; 251/279; 251/280
[58] Field of Search ................. 60/533; 251/57, 58, 251/279, 280, 144; 74/18.2; 92/168

[56] References Cited

U.S. PATENT DOCUMENTS

| 2,004,715 | 6/1935 | Thwaits | 251/144 |
| 2,004,717 | 6/1935 | Thwaits | 251/279 |
| 2,246,348 | 6/1941 | Coffey | 251/57 |
| 2,535,590 | 12/1950 | Monsarrat | 251/280 |
| 2,652,070 | 9/1953 | Marx | 251/58 |
| 3,043,338 | 7/1962 | Hanson | 74/18.2 |
| 3,266,383 | 8/1966 | Cairns | 60/533 |
| 3,391,646 | 7/1968 | Schlosser | 74/18.2 |
| 3,420,495 | 1/1969 | Muehl | 251/144 |
| 3,742,772 | 7/1973 | Makovee | 74/18.2 |
| 3,786,903 | 1/1974 | Haga et al. | 60/533 |

Primary Examiner—Martin P. Schwadron
Assistant Examiner—G. L. Walton
Attorney, Agent, or Firm—Fulwider, Patton, Rieber, Lee & Utecht

[57] ABSTRACT

A tank valve apparatus particularly adapted for effecting rapid discharge of the liquid contents of a tanker truck or the like, the apparatus being characterized by an improved valve opening apparatus actuated by an air cylinder. The cylinder includes a single acting piston requiring a certain cylinder pressure to move the valve to its open position, but requiring a significantly lower pressure to permit its return stroke, whereby rapid closure of the tank valve is facilitated.

4 Claims, 7 Drawing Figures

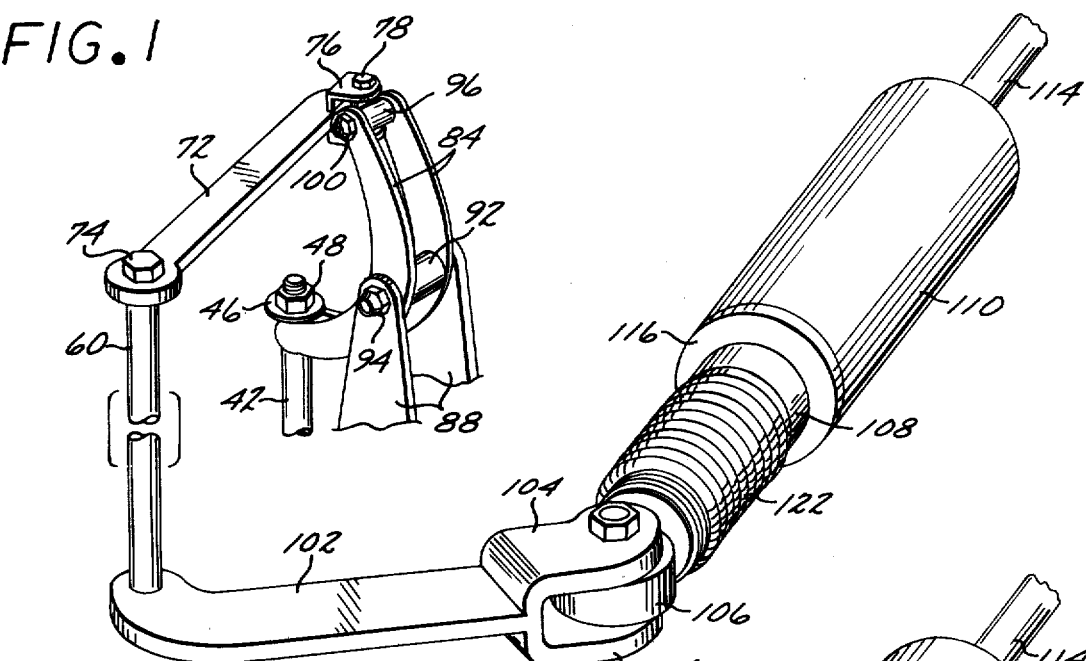
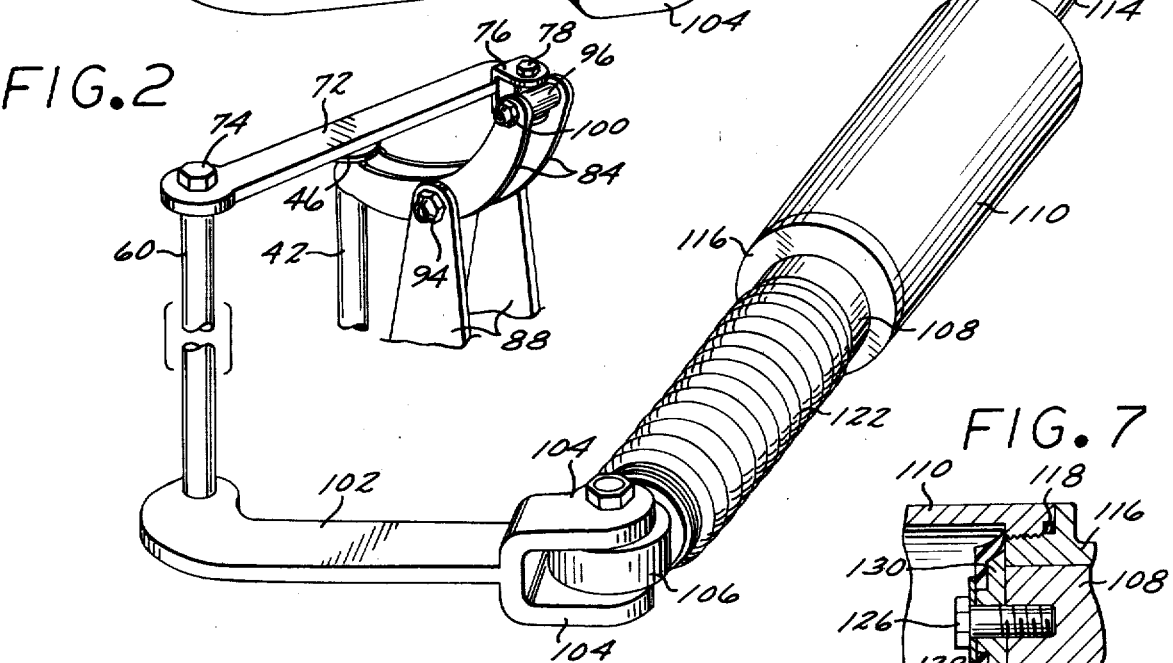
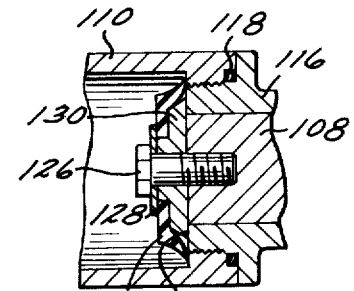
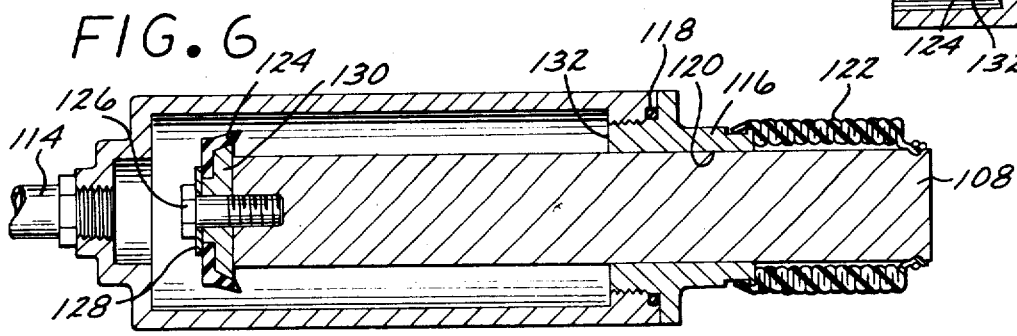

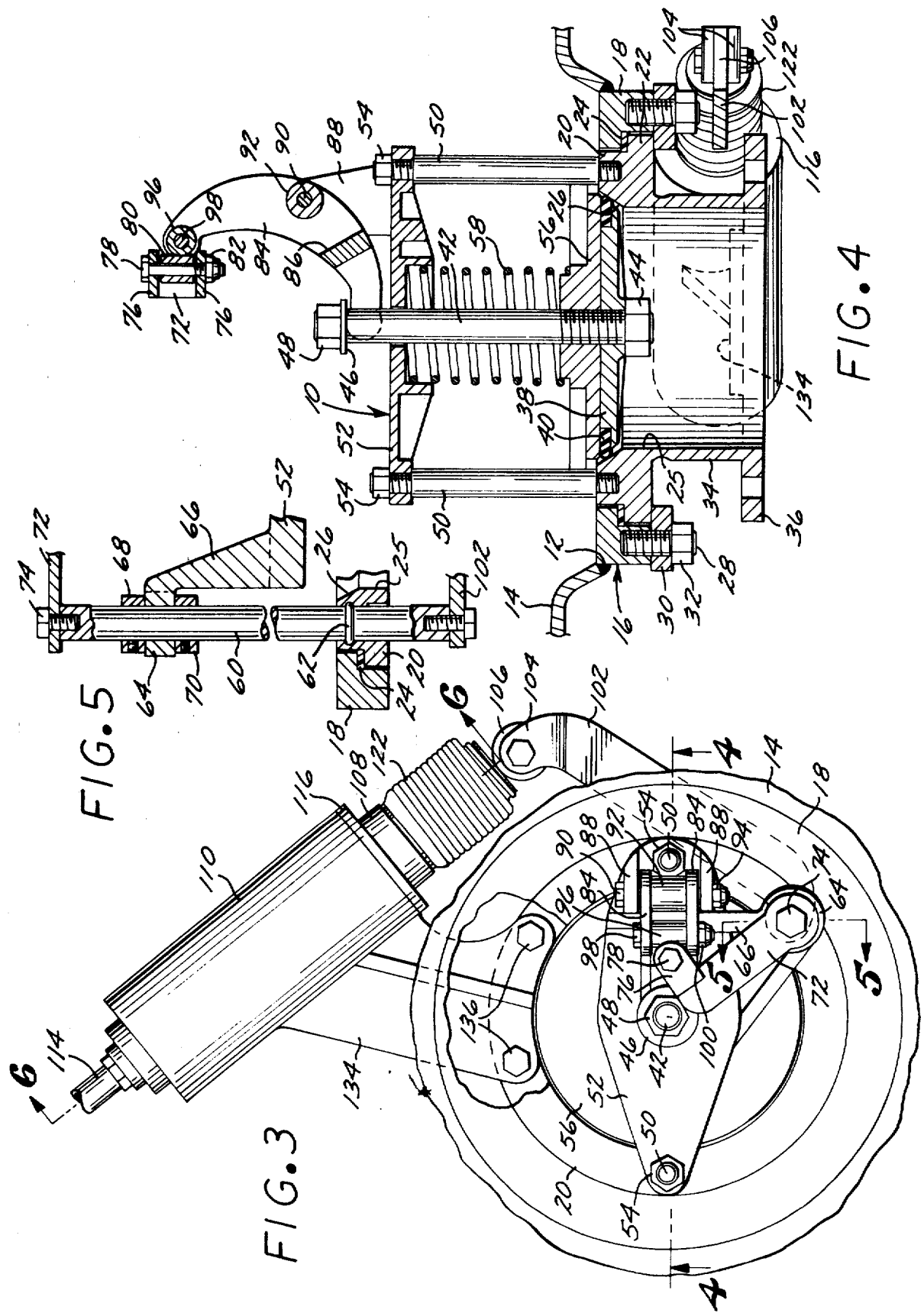

TANK VALVE APPARATUS

BACKGROUND OF THE INVENTION

1. Field of the Invention

The invention relates to the field of discharge valve apparatus for a tank, and particularly a valve apparatus for use with a tanker truck or the like of the type commonly used for transporting bulk gasoline or other liquid.

2. Description of the Prior Art

Existing valves for tanker trucks, as exemplified by the valve disclosed in my U.S. Pat. No. 3,420,495, patented Jan. 7, 1969, and entitled "Tank Valve Apparatus," are characterized by an actuating cylinder operative upon a linkage system to open the tank valve against the bias of a tank valve spring. Such a cylinder includes a single acting piston engaged upon the walls of the cylinder and movable to its extended position to open the valve by a force which is the product of the cylinder pressure and the area of the piston.

Such a cylinder presents maintenance problems because eventual scoring of the cylinder walls is caused by continued reciprocation of the piston. In addition, the friction of the piston upon the cylinder walls typically requires use of a return spring to initiate return movement of the piston upon release of pressure to the cylinder to close the tank valve. Relatively rapid return movement of the piston is desirable to allow the tank valve closing spring to forceably close the valve and thereby provide optimum seating.

In addition to the foregoing problems presented by prior art air cylinders, many of the prior art tank valve systems employ a relatively complex, high friction linkage means for opening the tank valve. The number of parts and the manner of their interaction is such that higher than desirable air pressures are necessary to operate such linkage means. This, in turn, requires that tanker trucks carry larger air compressors or operate the compressors more continuously.

SUMMARY OF THE INVENTION

According to the present invention, the tank valve apparatus is characterized by usual mounting means for securement to the tanker truck to define the discharge opening from the tank. The tank valve itself is reciprocably movable between open and closed positions, being biased toward its closed position by a spring.

An improved linkage means coupled to the valve is operated by an actuating means which comprises an elongated cylinder having an opening to admit pressurized fluid, and an opening for the piston rod. The piston is spaced from the longitudinally extending walls of the cylinder. Consequently, the effective force to move the piston toward its seated position against the cylinder end wall is produced by the cylinder pressure acting against the area of the piston rod. Once the piston is seated, with the tank valve being held open, the holding force tending to maintain the piston in its seated position is a product of the cylinder pressure acting against the area of the piston rather than just the piston rod area. Consequently, the cylinder pressure must drop to a relatively low level before the bias of the tank valve spring unseats the piston. Once unseated, the rapid loss of the holding force allows a desirably rapid piston retracting movement, accompanied by a snap action closure of the tank valve.

Maintenance problems associated with the air cylinder are minimal since the piston is at all times out of sliding engagement with the cylinder walls.

The present tank valve apparatus is also characterized by an improved low friction linkage means for moving the tank valve toward its open position. The linkage means comprises a torque rod coupled by a lower crank arm to the air cylinder, and coupled by an upper crank arm to a rocker means located within the tank and engaged upon the valve stem of the tank valve. Actuation of the air cylinder effects rotation of the torque rod and pivotal movement of the rocker means to upwardly lift the valve stem. The linkage means has relatively few parts, and the rocker action lifting of the valve stem is characterized by relatively low friction, such that the air pressure requirements for the system are significantly less than that required for operation of related prior art systems.

The present valve apparatus is quickly attachable to existing tanker trucks, is relatively inexpensive to manufacture, is reliable in operation, and can be quickly removed for adjustment and maintenance.

Other objects and feature of the invention will become apparent from consideration of the following description taken in connection with the accompanying drawings.

BRIEF DESCRIPTION OF THE DRAWINGS

FIG. 1 is a perspective view of certain components of the present tank valve apparatus as the same would appear in the closed position of the tank valve;

FIG. 2 is a view similar to FIG. 1, as the components would appear in the open position of the tank valve;

FIG. 3 is a top plan view of the tank valve apparatus, illustrating the components as the same would appear in the closed position of the tank valve;

FIG. 4 is a view taken along the line 4—4 of FIG. 3;

FIG. 5 is a view taken along the line 5—5 of FIG. 3;

FIG. 6 is a view taken along the line 6—6 of FIG. 3; and

FIG. 7 is an enlarged partial longitudinal cross-sectional view of the piston in its seated position against the end wall of the cylinder.

DESCRIPTION OF THE PREFERRED EMBODIMENTS

Referring now to the drawings, there is illustrated a tank valve apparatus 10 adapted to effect rapid discharge of the liquid contents of a tank of a tanker truck or the like. The apparatus 10 is illustrated in FIGS. 3 and 4 as it would appear when mounted to the edge margins of an opening 12 in the bottom 14 of such a tank.

The apparatus 10 includes a mounting assembly 16 having an annular outer ring 18 welded or otherwise secured to the edge margins of the tank opening 12. The assembly 16 includes an annular inner ring 20 which fits within the central opening in the outer ring 18, and which is characterized by a peripheral flange 22 in abutting relation to the outer ring 18. An annular sealing ring or gasket 24 is interposed between the outer and inner rings 18 and 20 to provide a liquid-tight seal.

The central opening in the inner ring 20 defines a discharge opening 25 which terminates at its upper or inner extremity in a tapered valve seat 26.

The inner ring 20 is securely fastened to the outer ring 18 by a plurality of fastener assemblies disposed in circumferentially spaced relation about the periphery of the rings, each such assembly including a threaded stud 28 which is threaded into a suitable opening in the underside of the outer ring 18. An anchor lug 30 is axially slidably carried by each stud 28 and engages the undersides of the inner and outer rings. A nut 32 is threaded upon each stud 28 and engages the underside of the associated lug 30. Tightening of the nuts 32 detachably clamps the inner ring 20 to the outer ring 18 in sealing relation. Removal of the nuts 32 permits the inner ring 20 and the components mounted thereon to be quickly disassociated from the tank bottom 14.

The inner ring 20 includes an integral downwardly extending cylindrical portion 34 defining a continuation of the discharge opening 25 and terminating in a mounting flange 36 adapted to be clamped to a discharge conduit (not shown) for carrying away liquid discharged from the tank.

A circular valve 38 is disposed over the discharge opening 25 and includes an annular sealing ring 40 which rests upon the valve seat 26 in the closed position of the valve 38 to provide a liquid-tight seal. The valve 38 includes a central opening which slidably receives a vertically oriented valve stem 42, the valve 38 being retained on the valve stem 42 by a nut 44 threadably mounted to the lower threaded extremity of the valve stem 42.

The upper extremity of the valve stem 42 is also threaded and mounts a washer 46 and a lock nut 48.

On diametrically opposite sides of the valve stem 42 are a pair of vertically elongated support rods 50 whose threaded lower ends are threadably mounted within suitable openings provided in the inner ring 20. The threaded upper ends of the rods 50 are disposed through suitable openings in the lateral extensions of an upper spring retainer 52, and a pair of nuts 54 are mounted upon the upper threaded extremities of the rods 50 for securing the retainer 52 in position. The spring retainer 52 also acts as a guide for the valve stem 42 on opening and closing of the valve 38, as will be seen.

A circular lower spring retainer 56 rests upon the upper or inner face of the valve 38 and includes a pair of peripheral cut-out portions (not shown) in close association with the support rods 50 to guide the valve 38 in a vertical path during its opening and closing movements.

A compression spring 58 is disposed about the valve stem 42 with its opposite ends in abutment with the spring retainers 52 and 56. The spring 58 tends to bias the valve 38 to its closed position in seated relation upon the valve seat 26, as illustrated in FIG. 4.

The linkage means which are coupled to the valve 38 and operative to move it against the bias of the spring 58 toward an open position includes an elongated torque rod 60 which extends at its lower end through a suitable opening in the inner ring 20 of the mounting assembly 16. A conventional O-ring 62 is provided to afford a fluid-tight seal, as seen in FIG. 5.

The upper extremity of the rod 60 projects through a suitable opening in a laterally extending flange 64 of a support 66 which extends upwardly of and is integral with the upper spring retainer 52. A pair of locking collars 68 and 70 on the upper and lower sides of the flange 64, respectively, are secured in position to locate the rod in a predetermined vertical location for proper cooperation with the other components, as will be seen. The upper end of the torque rod 60 is provided with a pair of flats (not shown) which engage complemental flats (not shown) forming a part of the edge margins defining the central opening of an end portion of an upper operating or crank arm 72. A nut 74 secures the arm 72 to the torque rod 60.

The crank arm 72 extends horizontally and radially inwardly toward the valve stem 42 and terminates in a U-shaped end portion characterized by upper and lower legs 76 which, as best seen in FIG. 4, include opposed openings through which a bolt 78 is disposed to hold a vertically oriented roller 80 in position. A nut 82 secures the bolt 78 in position.

The aforementioned linkage means for operating the valve 38 also includes a rocker assembly comprising a pair of generally arcuate, vertically oriented and parallel rocker plates 84 integrally connected together by a cross member 86. The rocker plates 84 are mounted at approximately their midportions to a pair of parallel, spaced apart trunnions 88 for pivotal movement about a horizontal axis. The trunnions are integral at their lower extremities with the upper spring retainer 52 and are disposed at their upper extremities outwardly of the outer faces of the rocker plates 84. A bolt 90 passes through suitable openings in the rocker plates 84 and extends through a cylindrical transverse spacer 92 located between the plates 84. The bolt 90 is held in position by a nut 94.

The laterally spaced apart lower extremities of the rocker plates 84 are disposed on either side of the valve stem 42 in underlying relation to the washer 46 whereby upward pivotal movement of the lower extremities of the rocker plates 84 is effective to raise the valve 38 to its open position against the bias of the spring 58. Such upward pivotal movement of the rocker plates 84 is effected by rotation of the torque rod 60 in a clockwise direction, as viewed in FIGS. 1 and 2, to pivot the upper crank arm 72. This urges the vertical roller 80 against a horizontal roller 96 rotatably secured between the upper extremities of the rocker plates 84 by a bolt 98 passing through suitable openings in the plates 84 and held in position by a nut 100.

The linkage means for opening the valve 38 also includes a lower operating or crank arm 102 provided at one extremity with a central opening having a pair of opposed flats (not shown). The opposite extremity of the crank arm 102 includes a U-shaped portion having vertically spaced apart legs 104 which rotatably receive the outer end 106 of a piston rod 108. Outward extension of the piston rod 108 causes a clockwise movement of the lower crank arm 102, as seen in FIGS. 1 and 2, which moves the valve stem 42 from the closed position illustrated in FIG. 1 to the open position illustrated in FIG. 2.

The piston rod 108 forms a part of an actuating assembly for actuating the linkage means to operate the valve 38. This actuating assembly comprises an elongated air cylinder 110 having an opening 112 through one end wall in fluid communication with a conduit 114, as best seen in FIG. 6. The conduit 114 is connected to any suitable source of air under pressure, such as the usual tank of an air compressor typically carried by a tank truck.

The opposite end wall of the cylinder 110 is defined by a closure 116 threadably connected to the cylinder 110. A fluid-tight connection is afforded by a usual O-ring 118. The closure 116 includes a central opening defining a piston rod opening 120 which slidably receives the piston rod 108 in generally fluid-tight relation. A rubber sleeve or boot 122 is connected to the end of the closure 116 and to the end of the piston rod 108 to exclude dirt during operation of the cylinder 110, as will be apparent.

The internal chamber of the cylinder 110 is preferably although not necessarily circular in cross section and of substantially uniform diameter throughout.

A piston in the form of a U-cup or disk having an annular resilient skirt or seal 124 is mounted to the inner end of the piston rod 108 by a bolt 126. The bolt 126 is threaded into a suitable opening in the piston rod and acts upon a washer 128 which presses the seal 124 against a seal retainer 130 of lesser diameter than the seal 124.

The piston or seal 124 is at all times in spaced relation to the longitudinally extending walls of the cylinder 110 so that there is no opportunity for scoring of the cylinder to occur.

Air under pressure entering the cylinder 110 through the conduit 114 moves the piston rod 108 to the right to its extended position under a force which is the product of the cylinder pressure times the area of the piston rod 108. A typical pressure to effect such extension of the piston rod 108 is approximately 50 pounds per square inch. However, once the piston rod 108 is fully extended, as viewed in FIG. 7, the annular seal 124 is seated upon the end wall 132. At this time the effective pressure area is increased by the difference in area between the seal 124 and the piston rod 128 whereby the seal 124 remains seated despite a drop in cylinder pressure considerably below 50 psi. In actual practice it has been found that the cylinder pressure must drop to as low as approximately 20 psi or less before the seal 124 disengages the end wall 132. Once such disengagement occurs the loss of the pressure area defined provided by the seal 124 allows the piston rod 108 to be abruptly and rapidly moved to the left to its retracted position by the valve spring 58. There is an accompanying rapid, snap action closure of the tank valve 38.

The cylinder 110 is rigidly secured to the mounting assembly of the present apparatus 10 by means of a mounting arm 134 integral at its outer extremity with the cylinder 110 and secured by a pair of bolts 136 at its inner extremity to the mounting flange 36 of the inner ring 20, as best seen in FIGS. 3 and 4.

In operation, and assuming the tank with which the apparatus 10 is associated is to be discharged and that a suitable discharge conduit (not shown) has been coupled to the mounting flange 36, air under pressure is applied to the cylinder 110 to move the piston rod 108 to its extended position. The seal 124 engages the end wall 132, as best seen in FIG. 7, the force tending to hold the piston rod in its extended position is increased by a force equal to the product of the cylinder pressure and the difference between the area of the seal 124 and the area of the piston rod 108. Such extension of the rod 108 rotates the lower crank arm 102, the torque rod 60, and the upper crank arm 72, urging the roller 96 of the rocker plates 84 in a generally downward direction about the axis of the spacer 92, and raising the valve stem 42 open the tank valve 38.

The pressure in the cylinder 110 is next reduced to approximately 20 psi or less to unseat the seal 124, at which point the bias of the valve spring 58 abruptly and suddenly snaps the valve 38 shut. There is no need for any auxiliary or release spring in the cylinder to overcome any friction of the piston against the cylinder 110 since the piston is out of engagement with the longitudinal walls of the cylinder.

It has been found that the linkage means, and particularly including the rocker assembly arrangement, requires considerably less air pressure to operate, as compared to similar systems of the prior art.

Various modifications and changes may be made with regard to the foregoing detailed description without departing from the spirit of the invention.

I claim:

1. In a tank valve apparatus including mounting means for securement to a tank to define a discharge opening from said tank; a valve reciprocably movable between open and closed positions for opening and closing said discharge opening, respectively; bias means tending to move said valve toward said closed position; linkage means coupled to said valve and operative to move said valve against the bias of said bias means toward said open position; an improved actuating means for operating said linkage means, said actuating means comprising:

an elongated cylinder having an opening to admit pressurized fluid, and further having a piston rod opening in an end wall thereof;

a piston rod extending through said piston rod opening in substantially fluid tight relation and longitudinally reciprocable between an extended position and a retracted position, said actuating means being connected to said linkage means to locate said valve in said open position upon location of said piston rod in said extended position, and to locate said valve in said closed position upon location of said piston rod in said retracted position; and a piston located within said cylinder and carried by said piston rod, said piston having an end face portion defining a first effective pressure area and further having an opposite face portion defining a second effective pressure area less than said first effective pressure area, said opposite face portion being adapted to engage upon said end wall in sealing relation in said extended position of said piston rod thereby to isolate said opposite face portion from pressure in said cylinder, the periphery of said piston being out of sealing relation with the longitudinally extending walls of said cylinder whereby pressure in said cylinder is operative upon both said end face portion and said opposite face portion in locations of said piston rod other than said extended position.

2. A tank valve apparatus according to claim 1 wherein said piston is mounted to the end of said piston rod and includes a flexible cup adapted in said seated position to engage upon said end wall in fluid tight relation, said flexible cup being in spaced relation to said cylinder in all locations of said piston rod other than said extended position.

3. A tank valve according to claim 1 wherein said piston rod is connected to said linkage means and said cylinder is connected to said mounting means.

4. In a tank valve apparatus including mounting means for securement to a tank to define a discharge opening from said tank; a valve reciprocably movable between open and closed positions for opening and closing said discharge opening, respectively, and including a valve stem adapted to extend inwardly of said tank; bias means tending to move said valve toward said closed position; an improved means operative to move said valve against the bias of said bias means toward said open position, said improved means comprising:

linkage means including a torque rod rotatably disposed through said mounting means in fluid tight relation for extension into said tank, an upper crank arm connected at one extremity to the inner extremity of said torque rod; rocker means pivotally mounted intermediate its opposite extremities to said mounting means adjacent said valve stem, one extremity of said rocker means engaging said valve stem and operative to raise said valve stem upon upward pivotal movement of said one extremity of said rocker means, the opposite extremity of said rocker arm engaging said upper crank arm; a lower crank arm connected at one extremity to the outer extremity of said torque rod and operative to rotate said torque rod for operating said rocker means to raise said valve stem;

actuating means including an elongated cylinder having a single acting piston responsive to fluid pressure against its opposite sides to operate said lower crank arm, said piston being in spaced relation to the longitudinally extending walls of said cylinder, the rod side of said piston being adapted to engage said cylinder in sealing relation upon operation of said lower crank arm thereby to isolate said rod side from said fluid pressure.

* * * * *